United States Patent [19]

Takahashi

[11] Patent Number: 4,523,245
[45] Date of Patent: Jun. 11, 1985

[54] SLIDING MEMBER

[75] Inventor: Shiro Takahashi, Sendai, Japan

[73] Assignee: Sony Corporation, Tokyo, Japan

[21] Appl. No.: 414,334

[22] PCT Filed: Dec. 4, 1981

[86] PCT No.: PCT/JP81/00366
§ 371 Date: Aug. 4, 1982
§ 102(e) Date: Aug. 4, 1982

[87] PCT Pub. No.: WO82/01896
PCT Pub. Date: Jun. 10, 1982

[30] Foreign Application Priority Data
Dec. 5, 1980 [JP] Japan ............................ 55-174654[U]

[51] Int. Cl.³ .......................... G11B 5/10; G11B 5/40
[52] U.S. Cl. .............................. 360/130.21; 428/687;
242/179; 148/403
[58] Field of Search ................... 148/403; 360/130.21,
360/130.24, 130.22; 242/76, 179; 428/681, 687

[56] References Cited
U.S. PATENT DOCUMENTS

| 3,871,836 | 3/1975 | Polk et al. | 148/403 |
| 3,940,293 | 2/1976 | Polk et al. | 148/403 |
| 4,152,144 | 5/1979 | Hasegawa et al. | 148/403 |
| 4,163,266 | 7/1979 | Tamamura et al. | 360/130.21 |
| 4,276,575 | 6/1981 | Schoettle et al. | 360/130.21 |
| 4,306,908 | 12/1981 | Takayama et al. | 148/403 |
| 4,416,709 | 11/1983 | Ohya et al. | 148/403 |
| 4,437,912 | 3/1984 | Sakakima et al. | 148/403 |

FOREIGN PATENT DOCUMENTS

| 48888 | 4/1982 | European Pat. Off. | 148/403 |
| 25409 | 3/1978 | Japan | 360/130.21 |
| 20918 | 2/1979 | Japan | 148/403 |
| 138411 | 10/1979 | Japan | 360/130.21 |
| 156917 | 12/1981 | Japan | 148/403 |
| 830553 | 5/1981 | U.S.S.R. | 360/130.21 |

Primary Examiner—Peter K. Skiff
Assistant Examiner—John J. Zimmerman
Attorney, Agent, or Firm—Hill, Van Santen, Steadman & Simpson

[57] ABSTRACT

A sliding member made with amorphous metallic material on the sliding surface. The sliding member has a small coefficient of friction with magnetic tape by constructing the member in this manner together with high hardness. Accordingly, it can prevent magnetic tape from adhering to the member and thus has excellent running characteristic.

4 Claims, 3 Drawing Figures

SLIDING MEMBER

TECHNICAL FIELD

The present invention relates to a sliding member and, more particularly, to a sliding member in which a sliding surface is made of an amorphous metallic material. The sliding member of the present invention may be for instance applied to a head drum, a tape guide and the like of a video tape recorder.

BACKGROUND ART

In a video tape recorder or the like, a sliding member such as a tape guide or a head drum for guiding magnetic tape must have a small coefficient of friction with magnetic tape and an excellent abrasion resistance. Aluminum alloys widely adopted as conventional materials for the sliding members such as a head drum, have drawbacks in that they are easy to wear because of their relatively great coefficients of friction and low hardnesses. Therefore, the magnetic tape adheres to the sliding members made of aluminum alloys and may not run smoothly for this reason, or the magnetic tape causes squeaking. These phenomena are notable especially when the magnetic tape is run under the condition of relatively high temperature and humidity.

DISCLOSURE OF INVENTION

In a sliding member of the present invention, the sliding surface is made of an amorphous metallic material, so that the coefficient of friction with magnetic tape is small; besides the hardness is high, and especially running characteristics of the tape are excellent.

BEST MODE OF CARRYING OUT THE INVENTION

Figure 1:
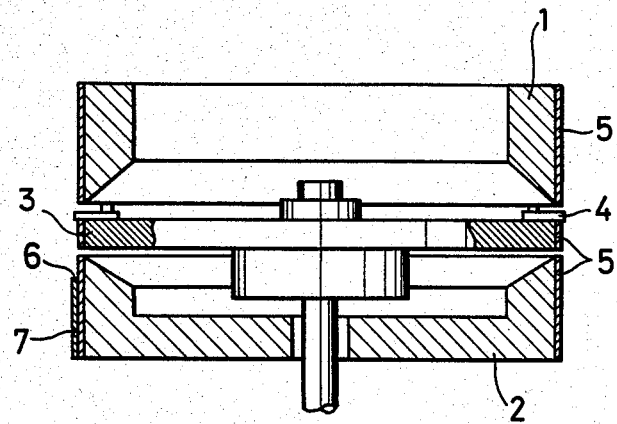
FIG. 1 is a sectional view wherein a sliding member of the present invention is applied to a head drum of a video tape recorder.

Any amorphous metallic material may be used in the present invention as long as it satisfies the purpose to be accomplished by the sliding member of the present invention. Examples of such an amorphous metallic material may include those materials which contain transition metal elements such as Fe, Co or Ni or metal elements such as Cr in the atomic ratio of about 60 to 90%, or those materials which contain metalloids such as P, C, B or Si in the atomic ratio of about 40 to 10%.

For the present invention, it suffices that only the sliding surface of the sliding member is mede of an amorphous metallic material. However, the overall sliding member may be made of an amorphous metallic material. The method for manufacturing only the sliding surface of the sliding member from an amorphous metallic material is not particularly limited; a conventional method may be adopted. For instance, an amorphous metallic material is formed into a ribbon of a 20 to 30μ thickness and the ribbon then adheres to the surface of a sliding member main body, which was made of another material to provide a sliding surface. The amorphous metallic material may be easily formed into a ribbon by a rolling rapid cooling apparatus which is disclosed, for example, in Japanese patent application No. 52-22936 (Japanese Laid-Open Patent Application No. 53-106339) or in Japanese patent application No. 52-22937 (Japanese Laid-Open Patent Application No. 53-106340). Needless to say, the amorphous metallic material may be easily formed into a ribbon by the double-roller method, the single-roller method, the liquid rapid cooling method or the like. If the overall sliding member is made of an amorphous metallic material, a sliding member of desired shape may be prepared by the conventional forming. The amorphous metallic materials as described above are easy to work with as compared with ferrite or ceramic and are thus advantageous.

A comparison of coefficients of friction and Vickers Hardness (Hv) between various types of materials and the amorphous metallic material will be shown in the table below:

TABLE

| Material | Coefficient of Friction | Vickers Hardness |
| --- | --- | --- |
| Aluminum | 0.24 | — |
| Sendust | 0.23 | 500 |
| Ferrite | 0.16 | 680 |
| Amorphous metallic material (Fe—Co—Si—B-type) (Surface roughness within ±2μ) | 0.12 | 850 |
| (Surface roughness within ±1μ) | 0.16 | — |

As may be seen from the above table, the amorphous metallic materials have smaller coefficients of friction and higher hardnesses than those of aluminum, Sendust and ferrite. Furthermore, if the surface roughness is less than about ±2, the amorphous metallic material has an extremely small coefficient of friction. Therefore, the amorphous metallic material provides a surface of an excellent quality without special finish.

The amorphous metallic material has magnetization lower than that of ferrite or the like and has electrification lower than that of ceramic.

As has been described above, the amorphous metallic material is particularly suitable for a material to make up the sliding surface of the sliding member.

The present invention will further be described with reference to the accompanying drawings.

A head drum of a video tape recorder shown in FIG. 1 is of three-layered structure including an upper stationary cylinder 1, a lower stationary cylinder 2 and a rotary head cylinder 3. A pair of magnetic heads 4 are mounted on the rotary head cylinder. An amorphous metallic material layer 5 is formed on the tape sliding surface of each cylinder. Referring to FIG. 1, the material layer is formed by having a ribbon of an amorphous metallic material adhere to that part of the main body which will become the tape sliding surface.

Although a lead 6 for guiding magnetic tape is mounted on the lower stationary cylinder 2, this lead may be formed by having the other amorphous metallic material layer 7 adhere to the outer surface of the amorphous metallic material layer 5 so that the upper end of the layer 7 may serve as a lead. If the amorphous metallic material is made into a ribbon whose shape has a lead, another method to form a lead may be offered by having such ribbon adhere to the main body of the sliding member. In order to form a ribbon of such a shape with a rolling rapid cooling apparatus as described above, a step corresponding to the lead is formed on a cooling roller for rapidly cooling a melted amorphous metallic material, and the amorphous metallic material is rapidly cooled thereon.

According to the present invention, the amorphous metallic material layer may be formed on that part of the member which will be brought into sliding contact with magnetic tape and need not therefore be formed on the entire surfaces of the cylinders. If the sliding part or part of the sliding member alone is made of an amorphous metallic material, the rest of the member may be made of a conventional material such as a hard plastic or an aluminum alloy.

Figure 2:
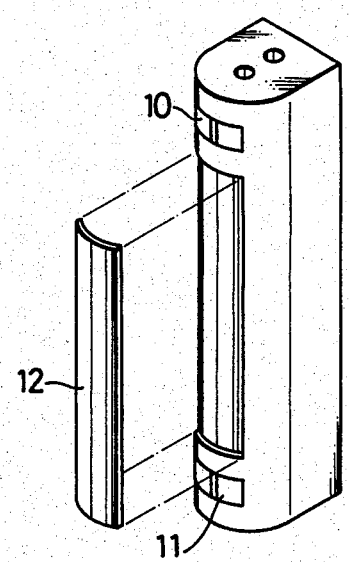
FIG. 2 is an exploded perspective view wherein a sliding member of the present invention is applied to an AC head of a video tape recorder.

FIG. 2 shows an AC head (audio/control head) of a video tape recorder to which a sliding member of the present invention is applied. Magnetic heads 10 and 11 for recording audio and control signals respectively are mounted on the upper and lower side edges of the AC head. An amorphous metallic material layer 12 adheres to the sliding part between the magnetic heads.

Figure 3:
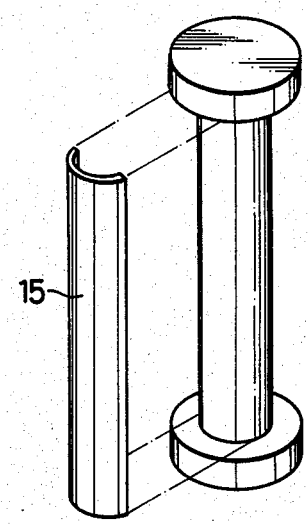
FIG. 3 is an exploded perspective view wherein a sliding member of the present invention is applied to a guide pin.

FIG. 3 shows a guide pin to which a sliding member of the present invention is applied. In this guide pin, an amorphous metallic material layer 15 adheres to the tape sliding surface.

Industrial Applicability

Since that part of the sliding member of the present invention which corresponds to the sliding surface is made of an amorphous metallic material, the coefficient of friction between the sliding surface and magnetic tape is small and the sliding surface has a high hardness. Therefore, adhesion of the magnetic tape to the sliding member may be prevented and excellent running characteristics of the magnetic tape may be guaranteed. The amorphous metallic material is easy to work with and is effective to lower the manufacturing cost of the member.

I claim:

1. A magnetic head drum assembly comprising first and second cylindrical drums coaxially supported to form a composite guiding surface for a traveling magnetic recording medium, said first and second drums being spaced by an axial gap, at least one magnetic head extending into said axial gap and arranged to contact a traveling magnetic recording medium on said guiding surface, and at least a portion of said guiding surface being composed of an amorphous metallic material.

2. A magnetic head drum assembly according to claim 1, wherein said portion is formed by adhering a thin film of an amporphous metallic material.

3. A magnetic head drum assembly according to claim 1, wherein said amorphous metallic element is composed of 60 to 90 atomic % of a transition metal element and 10 to 40 atomic % of a metalloid element.

4. A magnetic head drum assembly according to claim 3, wherein said amorphous metallic material is composed of Fe, Co, Si and B.

* * * * *